United States Patent
Kim et al.

(10) Patent No.: US 11,515,535 B2
(45) Date of Patent: Nov. 29, 2022

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si (KR)

(72) Inventors: Young-Ki Kim, Yongin-si (KR); Jungjoon Park, Yongin-si (KR); Soonrewl Lee, Yongin-si (KR); Youngjoo Chae, Yongin-si (KR); Ickkyu Choi, Yongin-si (KR); Mingzi Hong, Yongin-si (KR); Soonkie Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 331 days.

(21) Appl. No.: 16/809,460

(22) Filed: Mar. 4, 2020

(65) Prior Publication Data

US 2020/0287215 A1 Sep. 10, 2020

(30) Foreign Application Priority Data

Mar. 5, 2019 (KR) .................. 10-2019-0025305
Mar. 4, 2020 (KR) .................. 10-2020-0027096

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 4/1391* (2013.01);
(Continued)

(58) Field of Classification Search
None
See application file for complete search history.

(56) References Cited

U.S. PATENT DOCUMENTS

2012/0015250 A1 1/2012 Teng et al.
2013/0323598 A1* 12/2013 Liu ................... C01G 53/50
429/223

(Continued)

FOREIGN PATENT DOCUMENTS

EP 3396746 A1 10/2018
EP 3647269 A1 5/2020
(Continued)

OTHER PUBLICATIONS

KIPO Notice of Allowance dated Aug. 11, 2021 of corresponding Korean Patent Application No. 10-2020-0027096, 6 pages.
(Continued)

*Primary Examiner* — Wyatt P McConnell
(74) *Attorney, Agent, or Firm* — Lewis Roca Rothgerber Christie LLP

(57) ABSTRACT

A positive active material for a rechargeable lithium battery includes a first compound represented by Chemical Formula 1, and a second compound having a smaller particle diameter than the first compound and represented by Chemical Formula 2, wherein the first compound and the second compound have a Ni content of about 50 at % to about 60 at % based on a total amount of metal elements excluding Li. A rechargeable lithium battery including the first compound and the second compound satisfies Relation 1:

$$V_s < V_1 \leq 3.6.$$ [Relation 1]

In Relation 1, $V_1$ is a voltage value at a point where a tangent line to a value corresponding to 50% of the first peak value
(Continued)

intersects the line dQ/dV=0, and $V_s$ is a charge start voltage, as determined from a differential capacity (dQ/dV)-voltage charge/discharge plot.

20 Claims, 15 Drawing Sheets

(51) Int. Cl.
    *H01M 4/1391* (2010.01)
    *H01M 4/36* (2006.01)
    *H01M 10/0525* (2010.01)
    *H01M 4/02* (2006.01)

(52) U.S. Cl.
    CPC ....... *H01M 4/366* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2014/0212749 A1 | 7/2014 | Choi et al. |
| 2014/0377659 A1 | 12/2014 | Oljaca et al. |
| 2015/0008363 A1 | 1/2015 | Kaburagi et al. |
| 2015/0010819 A1 | 1/2015 | Lee et al. |
| 2015/0243978 A1 | 8/2015 | Shon et al. |
| 2015/0340686 A1 | 11/2015 | Sun et al. |
| 2017/0077513 A1 | 3/2017 | Han et al. |
| 2018/0316009 A1 | 11/2018 | Park et al. |
| 2019/0013545 A1 | 1/2019 | Kim et al. |
| 2019/0067689 A1 | 2/2019 | Hong et al. |
| 2020/0144610 A1 | 5/2020 | Hong et al. |

FOREIGN PATENT DOCUMENTS

| | | |
|---|---|---|
| JP | 2015-220220 A | 12/2015 |
| KR | 10-2011-0132287 A | 12/2011 |
| KR | 10-2013-0105494 A | 9/2013 |
| KR | 10-2015-0006283 A | 1/2015 |
| KR | 10-2015-0099219 A | 8/2015 |
| KR | 10-2016-0049519 A | 5/2016 |
| KR | 10-1686720 B1 | 12/2016 |
| KR | 10-2017-0030796 A | 3/2017 |
| KR | 10-1785262 B1 | 10/2017 |
| KR | 10-2018-0121266 A | 11/2018 |
| WO | 2014/205215 A2 | 12/2014 |

OTHER PUBLICATIONS

KIPO Office Action dated Apr. 19, 2021 of corresponding Korean Patent Application No. 10-2020-0027096, 6 pages.

EPO Extended Search Report dated Aug. 4, 2020, for corresponding European Patent Application No. 20161073.0 (7 pages).

Yajuan Ji, et al., "Electrochemical Behavior of Suberonitrile as a High-Potential Electrolyte Additive and Co-Solvent for Li[Li$_{0.2}$Mn$_{0.56}$Ni$_{0.16}$Co$_{0.8}$]$_{O2}$ Cathode Material", Journal of the Electrochemical Society, Jan. 2015, pp. A774-A780, 162(4).

Yanli Ruan, et al., "Structural evolution and capacity degradation mechanism of LiNi$_{0.6}$Mn$_{0.2}$Co$_{0.2}$O$_2$ cathode materials", Journal of Power Sources, Oct. 1, 2018, pp. 539-548, vol. 400.

\* cited by examiner

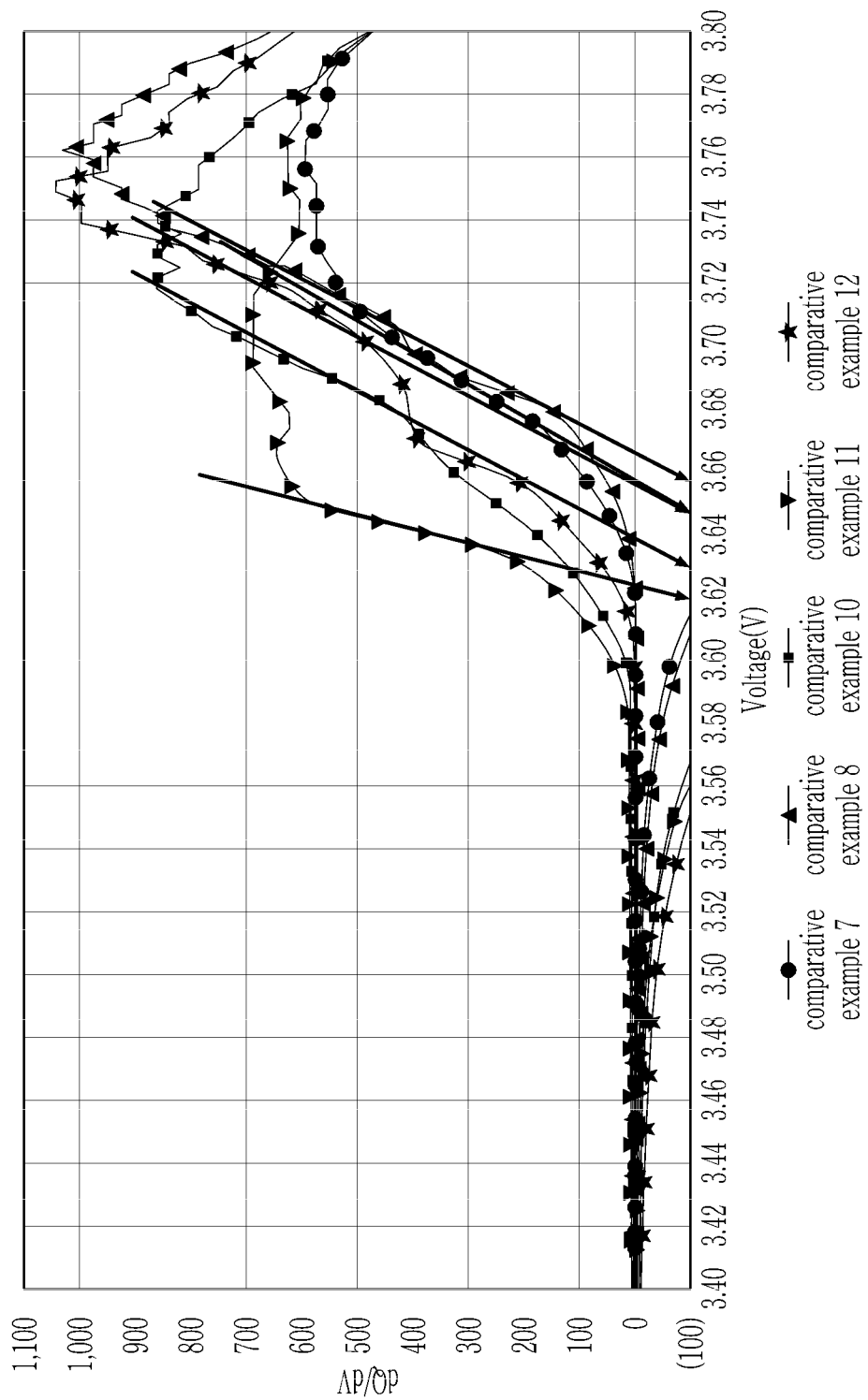

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATIONS

This application claims priority to and the benefit of Korean Patent Application No. 10-2019-0025305 filed in the Korean Intellectual Property Office on Mar. 5, 2019, the entire content of which is incorporated herein by reference. This application also claims priority to and the benefit of Korean Patent Application No. 10-2020-0027096 filed in the Korean Intellectual Priority Office on Mar. 4, 2020.

BACKGROUND

1. Field

One or more aspects of embodiments of the present disclosure are related to a positive active material for a rechargeable lithium battery, a method of preparing the same, and a rechargeable lithium battery including the same.

2. Description of the Related Art

In order to meet size (e.g., down-sizing) and high performance of various devices, rechargeable lithium batteries have become increasingly important power sources for their high energy densities, compact sizes, and reduced weights. The high capacity, high voltage stability, and high temperature stability of rechargeable lithium batteries are also important for electric vehicle applications and/or the like.

Various positive active materials have been investigated for use in rechargeable lithium batteries.

Nickel-based lithium transition metal oxides including Ni, Co, and Mn provide a higher discharge capacity per unit weight than $LiCoO_2$, but concurrently (e.g., simultaneously) provide a lower capacity per unit volume due to its low packing density, and therefore exhibits a low discharge capacity per unit volume in a rechargeable lithium battery. In addition, a rechargeable lithium battery including the nickel-based lithium transition metal oxide may show deteriorated safety during operation at a high voltage.

In particular, when the Ni content of the nickel-based lithium transition metal oxide is about 33 at % to about 60 at %, the charge/discharge efficiency of the rechargeable battery employing that material may be less than about 90%, a cation mixing value may be about 5%, and the Li/transition metal mole ratio may be 1.01 to 1.05. Theoretically, an ideal ratio of Li/metal (transition metal except Li) is 1.00. However, in synthesis methods of a Ni-based positive active material in the related art, excess Li is included relative to the transition metal, and therefore the charge/discharge efficiency of a rechargeable lithium battery employing the same may be deteriorated and a cation mixing value may be increased.

Therefore, it is desirable to have a positive active material having an ideal layered structure (e.g., a layered structure closer to the theoretical ideal) as achieved via decreased cation mixing, and a high efficiency rechargeable lithium battery employing the same.

SUMMARY

One or more aspects of embodiments of the present disclosure are directed toward a positive active material for a rechargeable lithium battery having improved phase stability due to an ideal layered structure (e.g., a structure for minimizing or decreasing cation mixing).

One or more aspects of embodiments of the present disclosure are directed toward a method of preparing the positive active material.

One or more aspects of embodiments of the present disclosure are directed toward a rechargeable lithium battery having improved charge/discharge capacity, charge/discharge efficiency, and/or cycle-life characteristics, by including the positive active material.

One or more example embodiments of the present disclosure provide a positive active material for a rechargeable lithium battery that includes a first compound represented by Chemical Formula 1, and a second compound having a smaller particle diameter than the first compound and represented by Chemical Formula 2, wherein the first compound and the second compound each have a Ni content of about 50 at % to about 60 at % based on the total amount of metal elements excluding Li, and a rechargeable lithium battery including the first compound and the second compound satisfies Relation 1, as determined from a differential capacity (dQ/dV)-voltage charge/discharge plot:

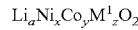  [Chemical Formula 1]

$Li_aNi_xCo_yM^1_zO_2$  [Chemical Formula 1]

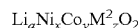  [Chemical Formula 2]

$Li_aNi_xCo_yM^2_zO_2$  [Chemical Formula 2]

In Chemical Formula 1 and Chemical Formula 2, 0.9≤a≤1.05, 0.5≤x≤0.6, 0.05≤y≤0.35, 0.05≤z≤0.35, x+y+z=1, and $M^1$ and $M^2$ are each independently at least one metal element selected from Mn, Al, Cr, Fe, V, Mg, Ti, Zr, Nb, Mo, W, Cu, Zn, Ga, In, Sn, La, and Ce.

$V_s < V_1 \leq 3.6$  [Relation 1]

In Relation 1, $V_1$ is a voltage value at a point where a tangent line to a value corresponding to 50% of the first peak value of the differential capacity (dQ/dV)-voltage charge/discharge plot intersects the line dQ/dV=0, and $V_s$ is a charge start voltage.

The charge start voltage ($V_s$) of the rechargeable lithium battery may be less than or equal to about 3.55 V.

The voltage ($V_1$) may be less than or equal to about 3.58 V.

The voltage ($V_1$) may be about 3.50 V to about 3.58 V.

A differential capacity (dQ/dV)-voltage charge/discharge plot may have at least two peak values in the range of about 3.60 V to about 3.85 V, and the second peak value may be larger than the first peak value.

The first peak value may be about 450 $mAhg^{-1}V^{-1}$ to about 550 $mAhg^{-1}V^{-1}$ and the second peak value may be about 550 $mAhg^{-1}V^{-1}$ to about 650 $mAhg^{-1}V^{-1}$.

At least one of the first compound and the second compound may include a core and a surface layer surrounding the core and a Ni atom concentration (at %) based on the total amount of metal elements excluding Li is higher than in the core, and a cation mixing of the positive active material may be less than or equal to about 3%.

The first compound may have an average particle diameter (D50) of about 15 μm to about 20 μm.

The second compound may have an average particle diameter (D50) of about 2 μm to about 5 μm.

The first compound and the second compound may be mixed in a weight ratio of about 90:10 to about 50:50.

The second compound may have a needle-shape, a sheet-shape, or a combination thereof.

The surface layer may be a region corresponding to a depth of about 200 nm from the surface of the first compound or the second compound.

One or more example embodiments of the present disclosure provide a method of preparing a positive active material which includes mixing Compound 1A represented by Chemical Formula 1A, Compound 2A represented by Chemical Formula 2A having a smaller particle diameter than Compound 1A, and a lithium salt to prepare a mixture; first heat-treating the mixture under a rapid temperature-increasing condition to prepare a first fired product including residual lithium; and second heat-treating the first fired product to prepare the positive active material.

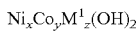
[Chemical Formula 1A]

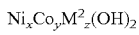
[Chemical Formula 2A]

In Chemical Formula 1A and Chemical Formula 2A, 0.5≤x≤0.6, 0.05≤y≤0.35, 0.05≤z≤0.35, x+y+z=1, and $M^1$ and $M^2$ are each independently selected from Mn, Al, Cr, Fe, V, Mg, Ti, Zr, Nb, Mo, W, Cu, Zn, Ga, In, Sn, La, and Ce.

The Compound 1A and Compound 2A may be mixed in a weight ratio of about 90:10 to about 50:50.

In the mixture, a mole ratio of Li/(Ni+Co+Mn) may be greater than or equal to about 0.99.

The rapid temperature-increasing condition may include increasing a temperature at about 4° C./min to about 6° C./min.

The first heat-treating may include a process of maintaining the mixture at about 800° C. to about 1000° C. for about 1 hour to about 4 hours.

The Compound 2A may have a needle-shape, a sheet-shape, or a combination thereof.

One or more example embodiments of the present disclosure provide a rechargeable lithium battery including a positive electrode including the positive active material; a negative electrode including a negative active material; and an electrolyte impregnated in the positive electrode and the negative electrode.

It is possible to provide a battery in which cation mixing is reduced, and charge/discharge capacity and/or efficiency are improved.

It is also possible to provide a battery in which unreacted residual lithium and gas generation on the surface of the positive active material are suppressed and phase stability and cycle-life characteristics are improved.

BRIEF DESCRIPTION OF THE DRAWINGS

FIG. 3E is a $1^{st}$ differential capacity (dQ/dV)-voltage charge/discharge plot of the half-cells manufactured in Comparative Example 7, 8, and 10 to 12.

DETAILED DESCRIPTION

Figure 1:
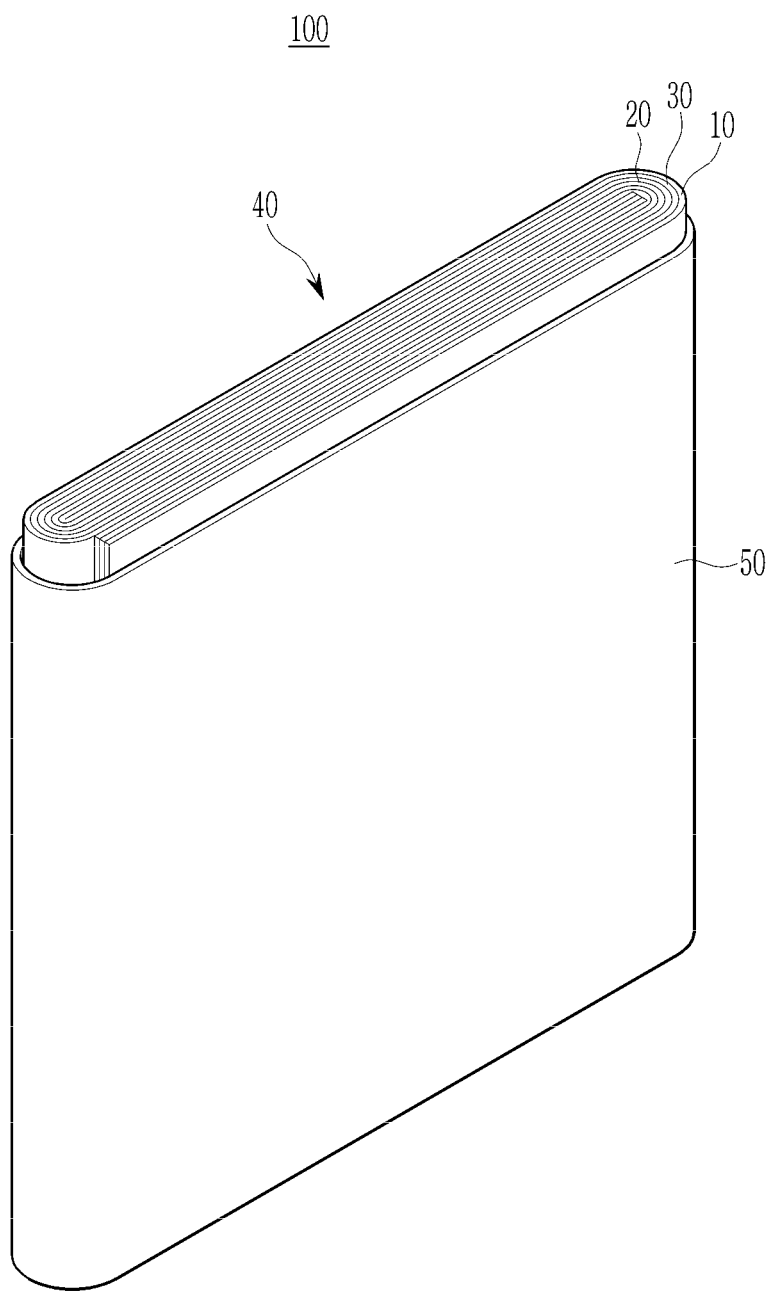
FIG. 1 is a schematic view illustrating a structure of a rechargeable lithium battery according to an embodiment.

Hereinafter, embodiments of the present disclosure will be described in more detail. However, these embodiments are examples, the present disclosure is not limited thereto, and the present disclosure is defined by the scope of the claims.

As used herein, when a specific definition is not otherwise provided, the term "first (or second) differential capacity (dQ/dV)-voltage charge/discharge plot" refers to a graph (plot) showing the change in capacity with respect to a change in voltage (dQ/dV) of a charging/discharging half-cell in the first (second) cycle.

It will be understood that when an element such as a layer, film, region, or substrate is referred to as being "on" another element, it can be directly on the other element, or intervening elements may also be present.

One or more example embodiments of the present disclosure provide a positive active material for a rechargeable lithium battery that includes a first compound represented by Chemical Formula 1, and a second compound having a smaller particle diameter than the first compound and represented by Chemical Formula 2, wherein the first compound and the second compound each have a Ni content of about 50 atomic % (at %) to about 60 at % of the metal elements excluding Li, where a rechargeable lithium battery including the first compound and the second compound satisfies Relation 1 in a differential capacity (dQ/dV)-voltage charge/discharge plot:

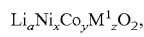
[Chemical Formula 1]

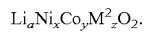
[Chemical Formula 2]

In Chemical Formula 1 and Chemical Formula 2, 0.9≤a≤1.05, 0.5≤x≤0.6, 0.05≤y≤0.35, 0.05≤z≤0.35, x+y+z=1, and $M^1$ and $M^2$ may each independently be at least one metal element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

$V_s < V_1 ≥ 3.6.$ [Relation 1]

In Relation 1, $V_1$ may be a voltage value at a point where a tangent line to a value corresponding to 50% of the first peak value of the differential capacity (dQ/dV)-voltage charge/discharge plot meets (intersects) the line dQ/dV=0, and $V_s$ may be a charge start voltage.

In each of the first compound and the second compound, a nickel content of the total metals except (excluding) lithium may be about 50 at % to about 60 at %, for example, greater than or equal to about 50 at %, greater than or equal to about 51 at %, greater than or equal to about 52 at %, greater than or equal to about 53 at %, greater than or equal to about 54 at %, or greater than or equal to about 55 at % and less than or equal to about 60 at %, less than or equal to about 59 at %, less than or equal to about 58 at %, less than or equal to about 57 at %, or less than or equal to about 56 at %. Accordingly, the charge/discharge capacity, efficiency, and/or cycle-life characteristics of the battery may be improved.

In general, as the content of nickel included in the positive active material increases, the charge start voltage ($V_s$) and the voltage ($V_1$) of the battery may be lowered, and thus the charge/discharge capacity and/or efficiency may be improved. However, as described above, the positive active material according to the embodiment has a relatively low charge start voltage ($V_s$) and voltage ($V_1$) despite having a relatively low nickel content, thereby improving the charge/discharge capacity and/or efficiency of the battery.

In the first compound and the second compound, a mole ratio (Mn/Ni) of manganese relative to nickel may independently fall in the range of about 0.36 to about 0.55, for example, about 0.45 to about 0.55; and a mole ratio (Mn/Co) of manganese relative to cobalt may fall in the range of about 0.8 to about 2.0, or about 1.25 to about 2.0. A commercially available high nickel NCM-based positive active material may have an initial charge/discharge efficiency of less than about 90%, but the positive active material according to the embodiment may have an initial charge/discharge efficiency of greater than or equal to about 92%, as well as an advantage of having a reduced manufacturing process cost, as less cobalt is used.

The second compound may have a smaller particle size than the first compound. For example, the average particle diameter (D50) of the first compound may be greater than or equal to about 15 μm, greater than or equal to about 16 μm, or greater than or equal to about 17 μm, and less than or equal to about 20 μm, less than or equal to about 19 μm, or less than or equal to about 18 μm. The second compound may have an average particle diameter (D50) of greater than or equal to about 2 μm or greater than or equal to about 3 μm, and less than or equal to about 5 μm, or less than or equal to about 4 μm. A difference in average particle diameter of the first compound and the second compound may thus be greater than or equal to about 10 μm, greater than or equal to about 11 μm, or greater than or equal to about 12 μm, and less than or equal to about 18 μm, less than or equal to about 17 μm, or less than or equal to about 16 μm. When the average particle diameters of the first compound and the second compound are each within the above ranges, the electrode mixture density may increase, and the high rate characteristics of the battery may be improved.

The first compound and the second compound may be in the form of secondary particles in which a plurality of primary particles are assembled, and the term "average particle diameter (D50)" may refer to an average particle diameter (D50) of the assembled secondary particles, unless otherwise stated.

In the present disclosure, the particle diameter may be defined as the average particle diameter (D50), which corresponds to the diameter of the particles at about 50% of the cumulative volume in the particle size distribution curve. The particle diameter may be measured using any suitable method, for example, by electron microscopy (such as scanning electron microscopy (SEM) or field emission scanning electron microscopy (FE-SEM)), or a laser diffraction method. The particle diameter may be measured by the laser diffraction method as follows. The particles to be measured are dispersed in a dispersion medium and then introduced into a commercially available laser diffraction particle size measuring apparatus (for example, MT 3000 by Microtrac), irradiated by ultrasonic waves at about 28 kHz and an output of about 60 W, and the average particle diameter (D50) corresponding to the 50% reference of the particle size distribution in a measuring apparatus may be calculated.

In the present disclosure, the term "particle size" may refer to a diameter (average diameter) when the particle is spherical, and when the particle has a shape like a plate shape or a needle shape other than a spherical shape, the particle diameter may refer to the longest length (average longest length or dimension) of the particle.

A rechargeable lithium battery including the first compound and the second compound may have a differential capacity (dQ/dV)-voltage (V) charge/discharge plot that satisfies Relation 1.

$$V_s < V_1 \leq 3.6 \quad \text{[Relation 1]}$$

In Relation 1, $V_1$ may be a voltage value at a point where a tangent line to a value corresponding to 50% of the first peak value of the differential capacity (dQ/dV)-voltage charge/discharge plot meets (intersects) the line dQ/dV=0, and $V_s$ may be a charge start voltage.

When the charge start voltage ($V_s$) and the voltage ($V_1$) meet (e.g., are valid for) Relation 1, the charge/discharge capacity and/or efficiency of the battery may be improved.

Hereinafter, the charge start voltage ($V_s$) and the voltage ($V_1$) of Relation 1 will be described with reference to FIGS. 2A and 3A.

Figure 2A:
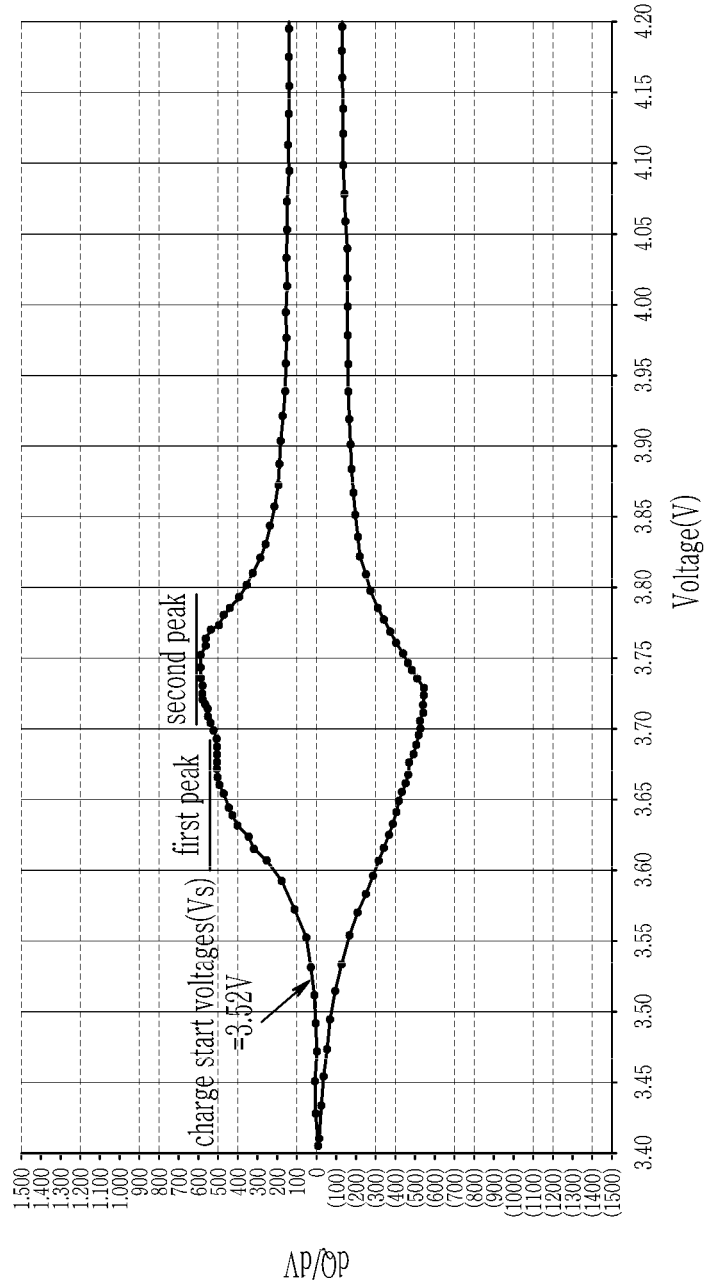
FIGS. 2A to 2D are $1^{st}$ differential capacity (dQ/dV)-voltage charge/discharge plots showing the charge start voltages ($V_s$) of the half-cells manufactured in Example 2 and Comparative Examples 8 to 10, respectively.
Figure 3A:
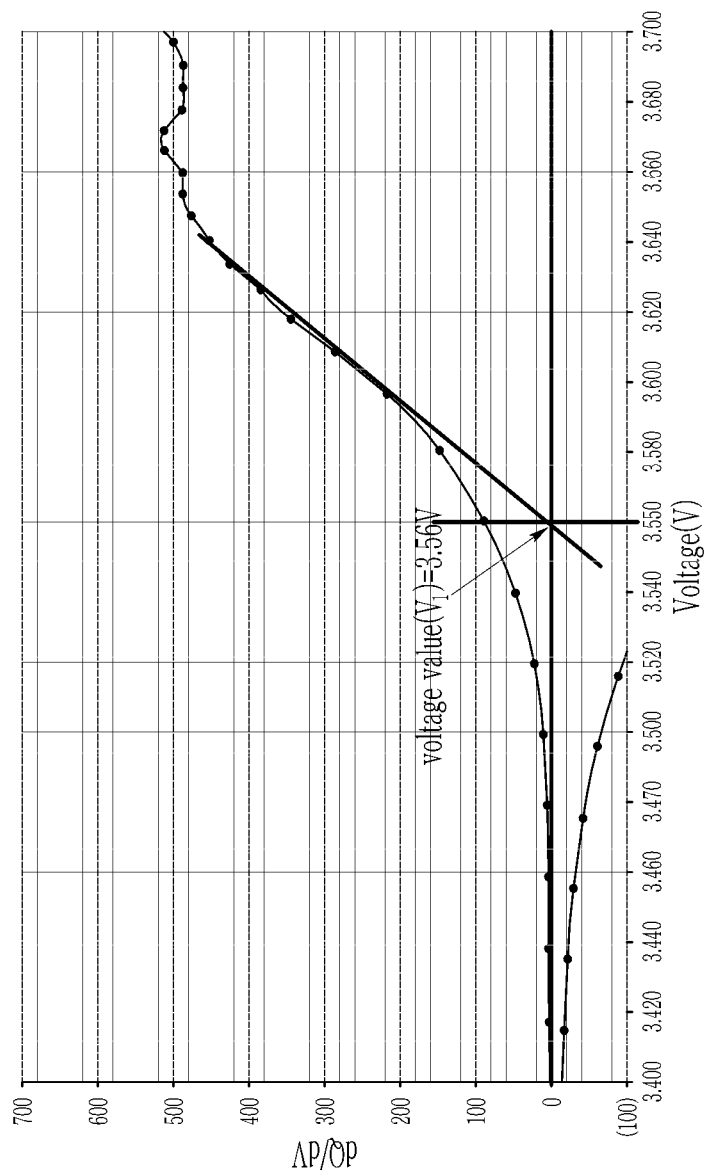
FIGS. 3A to 3D are $1^{st}$ differential capacity (dQ/dV)-voltage charge/discharge plots showing the voltages ($V_1$) where a tangent line to a value corresponding to 50% of the first peak value meets (intersects) the line dQ/dV=0 for the half-cells manufactured in Example 2 and Comparative Examples 8 to 10.

FIG. 2A is a $1^{st}$ differential capacity (dQ/dV)-voltage charge/discharge plot showing the charge start voltage ($V_s$) of the half-cell manufactured in Example 2, and FIG. 3A is a $1^{st}$ differential capacity (dQ/dV)-voltage charge/discharge plot showing the voltage ($V_1$) of the half-cell manufactured in Example 2.

Referring to FIG. 2A, in the $1^{st}$ differential capacity (dQ/dV)-voltage charge/discharge plot, the first point at which dQ/dV changes from 0 to a positive (+) value (e.g., >0) is the charge start voltage ($V_s$). For example, in FIG. 2A, the charge start voltage ($V_s$) corresponds to 3.52 V.

Referring to FIG. 3A, in the $1^{st}$ differential capacity (dQ/dV)-voltage charge/discharge plot, the point where the tangent line to the point corresponding to about 50% of the first peak value meets (intersects) the x-axis, or dQ/dV=0, is the voltage ($V_1$). For example, in FIG. 3A, the voltage ($V_1$) corresponds to about 3.56 V.

As used herein, the term "peak value of the differential capacity (dQ/dV)-voltage charge/discharge plot" refers to a dQ/dV value at the point at which a slope of the differential capacity (dQ/dV)-voltage charge/discharge plot is changed from a positive value (+) to a negative value (−). For example, the peak value may refer to the maximum value in the trace above the x-axis.

In some embodiments, the charge start voltage ($V_s$) may be less than or equal to about 3.55 V, for example, less than or equal to about 3.54 V, less than or equal to about 3.53 V, or less than or equal to about 3.52 V. The rechargeable lithium battery may be charged by increasing a voltage from a low voltage to a high voltage under constant current conditions. When the charge start voltage ($V_s$) is within the above-described range, an area enclosed by the differential capacity (dQ/dV)-voltage charge/discharge plot and the straight line of differential capacity (dQ/dV)=0, for example, the battery charge/discharge capacity may increase. As a result, the charge/discharge capacity and efficiency may be improved.

In the positive active material according to an embodiment, the voltage ($V_1$) may be less than or equal to about 3.58 V, for example about 3.50 V to about 3.58 V, or about 3.54 V to about 3.58 V. The charge start voltage ($V_s$) and the voltage ($V_1$) together characterize the form of the differential capacity (dQ/dV)-voltage (V) plot, and the charge start voltage ($V_s$) and the voltage ($V_1$) tend to be proportional to each other. For example, when the voltage ($V_1$) (also) falls within the above range, the charge/discharge capacity and/or efficiency may be improved.

In some embodiments, the $1^{st}$ differential capacity (dQ/dV)-voltage charge/discharge plot may have at least two peak values in the range of about 3.60 V to about 3.85 V, and in some embodiments the second peak value may be larger than the first peak value. In this case, the charge/discharge capacity and/or efficiency may be improved.

The first peak value may be about 450 mAhg$^{-1}$V$^{-1}$ to about 550 mAhg$^{-1}$V$^{-1}$, for example, about 460 mAhg$^{-1}$V$^{-1}$ to about 540 mAhg$^{-1}$V$^{-1}$, about 470 mAhg$^{-1}$V$^{-1}$ to about 530 mAhg$^{-1}$V$^{-1}$, about 480 mAhg$^{-1}$V$^{-1}$ to about 520 mAhg$^{-1}$V$^{-1}$, or about 490 mAhg$^{-1}$V$^{-1}$ to about 510 mAhg$^{-1}$V$^{-1}$. The second peak value may be about 550 mAhg$^{-1}$V$^{-1}$ to about 650 mAhg$^{-1}$V$^{-1}$, for example, about 560 mAhg$^{-1}$V$^{-1}$ to about 640 mAhg$^{-1}$V$^{-1}$, about 570 mAhg$^{-1}$V$^{-1}$ to about 630 mAhg$^{-1}$V$^{-1}$, about 580 mAhg$^{-1}$V$^{-1}$ to about 620 mAhg$^{-1}$V$^{-1}$, or about 590 mAhg$^{-1}$V$^{-1}$ to about 610 mAhg$^{-1}$V$^{-1}$. When the first peak value and the second peak value are within the above-described ranges, the charge/discharge capacity and/or efficiency may be improved.

Figure 4A:
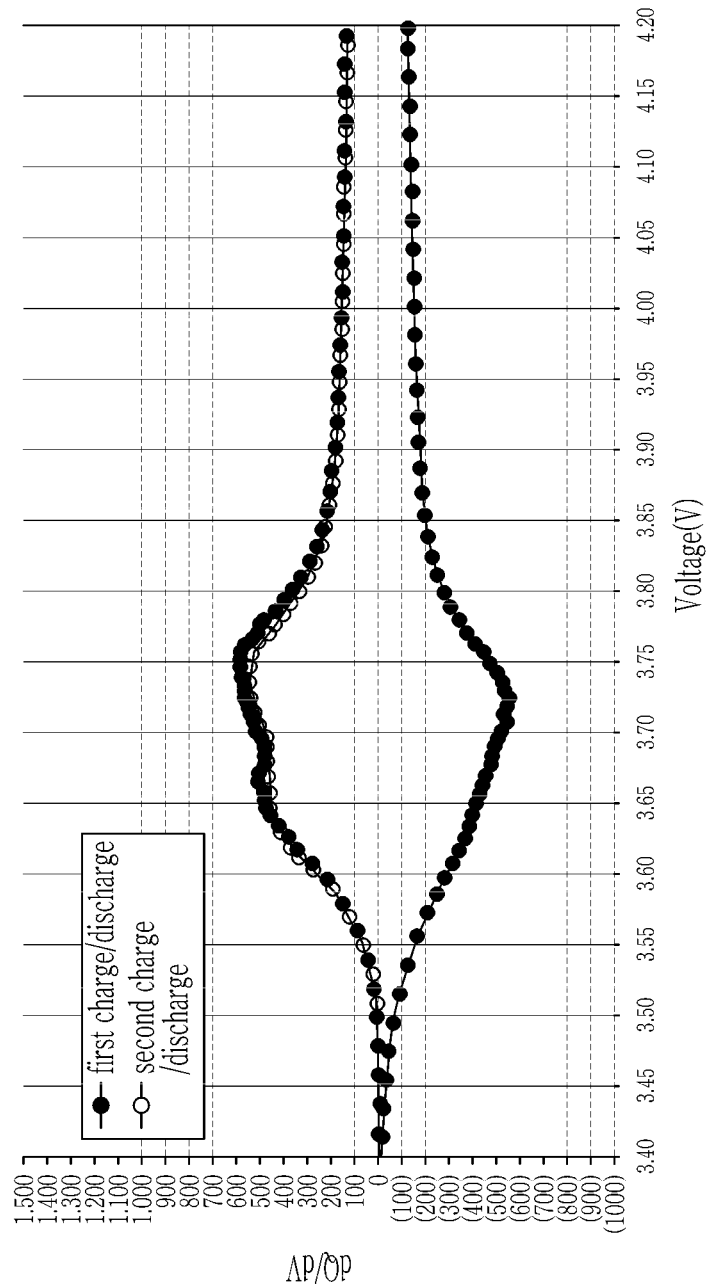
FIGS. 4A to 4D show comparison plots of the $1^{st}$ and $2^{nd}$ differential capacity (dQ/dV)-voltage charge/discharge cycles of the half-cells manufactured in Example 2 and Comparative Examples 8 to 10.

As shown in e.g., FIG. 4A, in the half-cell including the positive active material according to the embodiment, the shape of the $2^{nd}$ differential capacity (dQ/dV)-voltage charge/discharge plot may closely match the shape of the $1^{st}$ differential capacity (dQ/dV)-voltage charge/discharge plot. Without being bound by the correctness of any explanation of theory, it is thought that this occurs because the phase structures of the positive active material remain constant even after the first charge/discharge process. For example, due to the ideal layered structure (for minimizing or decreasing the cation mixing) of the positive active material, the phase stability of the positive active material may be improved, and the charge/discharge capacity, charge/discharge efficiency, and/or cycle-life characteristics of the battery may be improved.

At least one of the first compound and the second compound may include a core and a surface layer surrounding the core.

The surface layer may be a region within a depth of about 200 nm, for example about 190 nm or about 180 nm, from a surface (outer surface) of the first compound secondary particle or the second compound secondary particle, and the core may be the remaining region, for example, excluding the surface layer.

In the positive active material according to the embodiment, the Ni atom concentration (at %) of the surface layer may be higher than the Ni atom concentration (at %) of the core.

The positive active material may be prepared through two heat-treatment processes. A large amount of residual lithium present on the surface of the secondary particles that is generated during the first heat-treating process may be introduced into (e.g., incorporated within) the secondary particles by reacting with the transition metal hydroxide during the second heat-treating. Thereby, it is thought that the nickel content of the positive active material surface layer may be accordingly increased. As a result, because the nickel content in the surface layer (which is the region where lithium ions are most active) is relatively high, the performance of the battery may be improved.

The positive active material may have a cation mixing of less than or equal to about 3%, for example, less than or equal to about 2.9%, less than or equal to about 2.8%, less than or equal to about 2.7%, less than or equal to about 2.6%, less than or equal to about 2.5%, or less than or equal to about 2.4%.

The term "cation mixing" refers to a phenomenon in which Li$^+$ (0.76 Å) and Ni$^{2+}$ (0.69 Å) exchange their crystal sites, as facilitated by having a similar ion radius. Because nickel tends to favor a divalent valence rather than a trivalent valence, a divalent nickel ion (Ni$^{2+}$) having a similar ion radius as a lithium ion may be mixed into (e.g., diffused into) an empty space (site) in a lithium layer having a lack of lithium, which may be caused by volatilization of a lithium salt raw material during high temperature firing. Such cation mixing may cause problems of producing a lithium nickel oxide having a non-stoichiometric composition. In addition, Ni$^{2+}$ mixed into the lithium layer may interrupt diffusion of lithium ions and may thus greatly increase irreversibility of the ion oxidation-reduction reaction of the battery, such that capacity of the rechargeable battery may be deteriorated. When the positive active material is prepared, the first heat-treating is performed at a high temperature, under a rapid temperature-increasing condition, and for a short time (duration), thereby reducing the cation mixing in the above range.

If the cation mixing falls within the above range, there are no or reduced problems caused by the cation mixing described above.

The term "cation mixing (%)" refers to a ratio (%) of a portion of nickel (Ni$^{2+}$) ion mixed to the Li site, and may be calculated from an X-ray diffraction (XRD) analysis.

The first compound and the second compound may be mixed at a weight ratio of about 90:10 to about 50:50, for example, about 80:20 to about 70:30. When the mixing ratio of the first compound and the second compound is within the above range, a mixture density of the positive active material may be increased, and swelling due to gas generation at high voltage and high temperature may be reduced.

The second compound may have a needle-shape, a sheet-shape, or a combination of shapes. When the second compound has the above-described shape, a mixture density of the positive active material may be increased and the charge/discharge capacity and/or efficiency of a battery may be improved.

Another embodiment provides a method of preparing a positive active material.

Hereinafter, the preparing method is explained in more detail.

One or more example embodiments of the present disclosure provide a method of preparing a positive active material that includes: mixing Compound 1A (represented by Chemical Formula 1A), Compound 2A (represented by Chemical Formula 2A and having a smaller particle diameter than Compound 1A), and a lithium salt to prepare a mixture, first heat-treating the mixture under a rapid temperature-increasing condition to prepare a first fired product including unreacted residual lithium; and second heat-treating the first fired product:

      [Chemical Formula 1A]

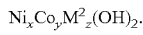      [Chemical Formula 2A]

In Chemical Formula 1A and Chemical Formula 2A, 0.5≤x≤0.6, 0.05≤y≤0.35, 0.05≤z≤0.35, x+y+z=1, and M$^1$ and M$^2$ may each independently be selected from Mn, Al, Cr, Fe, V, Mg, Ti, Zr, Nb, Mo, W, Cu, Zn, Ga, In, Sn, La, and Ce.

In Chemical Formula 1A and Chemical Formula 2A, the amounts and/or ratios of Ni, Co, M$^1$, and M$^2$ may be substantially the same as described in connection with the first compound and second compound represented by Chemical Formula 1 and Chemical Formula 2. The average particle diameters of Compound 1A and Compound 2A may respectively be the same as, or a little smaller than, those of the first compound and the second compound.

The lithium salt may be a lithium-containing carbonate (e.g., lithium carbonate (Li$_2$CO$_3$), etc.), a hydroxide (e.g., lithium hydroxide (LiOH), etc.), a hydrate (e.g., lithium hydroxide monohydrate (LiOH.H$_2$O), etc.), a nitrate (e.g., lithium nitrate (LiNO$_3$), etc.), and/or a chloride (e.g., lithium chloride (LiCl), etc.). One or a mixture of two or more thereof may be used, for example, lithium carbonate and/or lithium hydroxide may be used.

The lithium salt and Compound 1A and Compound 2A may be mixed so that a mole ratio of Li/(Ni+Co+Mn) may be greater than or equal to about 0.99, for example about 1.00 to about 1.25. When the lithium salt and Compound 1A and Compound 2A are mixed within the above-described mixing ratio ranges, a large amount of unreacted lithium may remain on the surface of the first fired product obtained from the first heat-treating (e.g., from at least one of the first compound and the second compound), and this residual lithium may react with at least one of Compound 1A and Compound 2A during the second heat-treating and thus form the positive active material including the first compound and the second compound.

The Compound 1A and Compound 2A may be mixed in (at) a weight ratio of about 90:10 to about 50:50, for example, about 80:20 to about 70:30.

The rapid temperature-increasing condition may include a process where a temperature of the mixture is raised from an initial temperature of about 25° C. to about 100° C. to a first heat-treating reaction temperature of about 800° C. to about 1000° C. at a rate of about 4° C./min to about 6° C./min. When the rapid temperature-increasing is performed in a short time, cation mixing may be prevented or reduced, and the first fired product may include a large amount of unreacted residual lithium.

For example, because the first heat-treating is performed at a high temperature (about 800° C. to about 1000° C.) under an air or oxidizing gas atmosphere for a short time (about 1 hour to about 4 hours), a large amount of a nickel-based transition metal hydroxide not participating in the reaction (at least one of Compound 1A and Compound 2A) may be present. Accordingly, Ni may be suppressed from being changed into Ni$^{2+}$, and accordingly, the Ni$^{2+}$ may be suppressed from moving into a Li site. Thus, cation mixing may be prevented or reduced, and a large amount of unreacted residual lithium may be included on the surface of the nickel-based lithium transition metal oxide (at least of the first compound and the second compound).

The term "oxidizing gas atmosphere" refers to a gas atmosphere including oxygen. The oxidizing gas atmosphere may include oxygen in an amount of about 20 volume % to about 40 volume %.

In the first heat-treating, an insertion height of the mixture may be greater than or equal to about 5 cm, for example, about 5 cm to about 8 cm. In this way, when the mixture is inserted into a heat-treatment equipment at the height of greater than or equal to about 5 cm during the first heat-treating, production may be increased and economic costs may thereby be decreased, and in addition, the unreacted residual lithium on the surface of the first fired product may be increased and thus well formed into a positive active material in the subsequent second heat-treating.

The first fired product is subsequently subjected to a second heat-treating.

The second heat-treating may be performed under conditions of heating from an initial temperature of about 25° C. to about 100° C. to a second heat-treating reaction temperature of about 700° C. to about 900° C. at a rate of about 5° C./min to about 10° C./min, maintaining the reaction temperature at about 700° C. to about 900° C. for about 3 hours to about 10 hours, and then cooling down at a rate of about 2.5° C./min to about 5° C./min to a final (completion) temperature about 25° C. to about 100° C.

The second heat-treating may be performed under an oxygen atmosphere with an oxygen amount of about 40 volume % to about 100 volume %.

The Compound 2A may have a needle-shape, a sheet-shape, or a combination thereof. The second compound obtained from the method of preparing the positive active material may be maintained in the shape of Compound 2A as it is.

Another embodiment provides a rechargeable lithium battery including a positive electrode including the positive active material; a negative electrode including a negative active material; and an electrolyte.

The positive electrode includes a current collector and a positive active material layer formed on the current collector and including a positive active material.

The positive active material layer may include a positive active material, and optionally a binder and a conductive material.

The positive active material is the same as described above.

In the positive active material layer, a content of the positive active material may be about 90 wt % to about 98 wt % based on a total weight of the positive active material layer.

The binder may be or include polyvinyl alcohol, carboxymethyl cellulose, hydroxypropyl cellulose, diacetyl cellulose, polyvinyl chloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and/or the like, but is not limited thereto.

Non-limiting examples of the conductive material include a carbon-based material (such as natural graphite, artificial graphite, carbon black, acetylene black, ketjen black, carbon fiber, and/or the like); a metal-based material of a metal powder or a metal fiber including copper, nickel, aluminum, silver, and/or the like; a conductive polymer (such as a polyphenylene derivative); and mixtures thereof.

Herein, the contents of each of the binder and the conductive material may be about 1 wt % to about 5 wt % based on a total weight of the positive active material layer.

The current collector may include an aluminum foil, a nickel foil, or a combination thereof, but is not limited thereto.

The negative electrode may include a current collector, and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbonaceous material. The carbonaceous material may be any generally-used carbon-based negative active material in a rechargeable lithium ion battery.

Non-limiting examples thereof include crystalline carbon, amorphous carbon, and mixtures thereof. The crystalline carbon may be non-shaped (e.g., having no particular shape), or sheet, flake, spherical, or fiber shaped natural graphite or artificial graphite. The amorphous carbon may be a soft carbon, a hard carbon, a mesophase pitch carbonization product, fired coke, and/or the like.

The lithium metal alloy includes an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be Si, SiOx (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and a combination thereof), and/or the like. At least one of these materials may be mixed with $SiO_2$. The elements Q and R may each independently be selected from Mg, Ca, Sr, Ba, Ra, scandium (Sc), yttrium (Y), Ti, Zr, hafnium (Hf), rutherfordium (Rf), V, Nb, tantalum (Ta), dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), boron (B), Al, Ga, Sn, In, thallium (Tl), Ge, phosphorus (P), arsenic (As), antimony (Sb), bismuth (Bi), sulfur (S), selenium (Se), tellurium (Te), polonium (Po), and combinations thereof.

The transition metal oxide may be vanadium oxide, lithium vanadium oxide, and/or lithium titanium oxide.

In the negative active material layer, the negative active material may be included in an amount of about 95 wt % to about 99 wt % based on the total weight of the negative active material layer.

In an embodiment, the negative active material layer may include a binder, and optionally a conductive material. In the negative active material layer, a content of the binder may be about 1 wt % to about 5 wt % based on a total weight of the negative active material layer. When the negative active material layer further includes a conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of the negative active material particles with one another and with the current collector. The binder may include a non-water-soluble binder, a water-soluble binder, or a combination thereof.

The non-water-soluble binder may be selected from an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be selected from a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinylpyrrolidone, polyepichlorohydrine, polyphosphazene, an ethylenepropylenediene copolymer, polyvinylpyridine, chlorosulfonatedpolyethylene, a latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 to about 3 parts by weight based on 100 parts by weight of the negative active material.

The conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum silver, and/or the like; a conductive polymer (such as a polyphenylene derivative); and/or a mixture thereof.

The current collector may include at least one selected from a copper foil, a nickel foil, a stainless steel foil, a titanium foil, a nickel foam, a copper foam, a polymer substrate coated with a conductive metal, and combinations thereof.

The electrolyte may include a non-aqueous organic solvent and a lithium salt.

The non-aqueous organic solvent may serve as a medium for transmitting ions taking part in the electrochemical reactions of the battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethyl acetate, methylpropionate, ethylpropionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles (such as R—CN, where R may be a C2 to C20 linear, branched, and/or cyclic hydrocarbon group and R may include a double bond, an aromatic ring, and/or an ether bond), and/or the like, amides (such as dimethyl formamide and/or the like), dioxolanes (such as 1,3-dioxolane and/or the like), sulfolanes, and/or the like.

The organic solvent may be used alone or in a mixture. When the organic solvent is used in a mixture, a mixing ratio may be controlled or selected in accordance with desirable battery performance.

In some embodiments, the organic solvent may further include an aromatic hydrocarbon-based organic solvent. Non-limiting examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound as a cycle-life improvement additive.

Non-limiting examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the cycle-life improvement additive may be used within a suitable or appropriate range.

The lithium salt dissolved in an organic solvent supplies a battery with lithium ions, basically operates the rechargeable lithium battery, and improves transportation of the lithium ions between a positive electrode and a negative electrode.

Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$, $LiC_4F_9SO_3$, $LiClO_4$, $LiAlO_2$, $LiAlCl_4$, LiN $(C_xF_{2x+1}SO_2)(C_yF_{2y+1}SO_2)$ (wherein, x and y are natural numbers, for example an integer of 1 to 20), LiCl, LiI, and $LiB(C_2O_4)_2$ (lithium bis(oxalato) borate, LiBOB).

The lithium salt may have a concentration of about 0.1 M to about 2.0 M. When the lithium salt is included at the above concentration, the electrolyte may have excellent performance and lithium ion mobility due to optimal or suitable electrolyte conductivity and viscosity.

The rechargeable lithium battery may further include a separator between the negative electrode and the positive electrode, depending on a type of the battery. Non-limiting examples of a suitable separator material include polyethylene, polypropylene, polyvinylidene fluoride, and multilayer combinations thereof (such as a polyethylene/polypropylene double-layered separator, a polyethylene/polypropylene/polyethylene triple-layered separator, and a polypropylene/polyethylene/polypropylene triple-layered separator).

FIG. 1 is an exploded perspective view of a rechargeable lithium battery according to an embodiment. The rechargeable lithium battery according to an embodiment is illustrated as a prismatic battery, but is not limited thereto and may include various suitably-shaped batteries such as a cylindrical battery, a pouch battery, coin-type, and/or the like.

Referring to FIG. 1, a rechargeable lithium battery 100 according to an embodiment includes an electrode assembly 40 manufactured by winding a separator 30 disposed between a positive electrode 10 and a negative electrode 20, and a battery case 50 housing the electrode assembly 40. An electrolyte may be impregnated in the positive electrode 10, the negative electrode 20, and the separator 30.

Hereinafter, examples and comparative examples are described. However, the following examples are merely examples, and the present disclosure is not limited thereto.

EXAMPLES

Example 1

A mixture was prepared by mixing lithium carbonate ($Li_2CO_3$) and $Ni_{0.55}Co_{0.25}Mn_{0.20}(OH)_2$ to provide a Li:(Ni+Co+Mn) mole ratio of 1.01:1.00. Herein, the $Ni_{0.55}Co_{0.25}Mn_{0.20}(OH)_2$ was obtained by mixing Compound 1A and Compound 2A having the same composition but different particle diameters in a weight ratio of 8:2.

The prepared mixture was subjected to a first heat-treating under conditions of heating at 5° C./min from 25° C. to 900° C., maintaining at 900° C. for 2 hours, and then cooling at 5° C./min until 25° C. to provide a first fired product including a first compound ($Li_{1.01}Ni_{0.55}Co_{0.25}Mn_{0.20}O_2$) and a second compound ($Li_{1.01}Ni_{0.55}Co_{0.25}Mn_{0.20}O_2$) having different particle diameters. The first heat-treating process was performed under an air atmosphere in an insertion height of 5 cm.

The first fired product was subjected to a second heat-treating under conditions of heating at 5° C./min from 25° C. to 850° C., maintaining at 850° C. for 10 hours, and then cooling down at 5° C./min until 25° C. to provide a positive active material in which the first compound ($LiNi_{0.55}Co_{0.25}Mn_{0.20}O_2$) and the second compound ($LiNi_{0.55}Co_{0.25}Mn_{0.20}O_2$) are mixed at a weight ratio of 8:2. The second heat-treating was performed under an oxygen ($O_2$) atmosphere.

In this case, an average particle diameter (D50) of the first compound was 20 μm, an average particle diameter (D50) of the second compound was 3 μm, and an average of the average particle diameters (D50) of the first compound and the second compound was 17 μm. The second compound had a shape of combining a long needle shape and a sheet shape.

Comparative Example 1

The commercial product NCM111 ($LiNi_{1/3}C_{1/3}Mn_{1/3}$, Yumi Koa Co., Ltd.) was used as the positive active material.

Comparative Example 2

The commercial product NCM523 ($LiNi_{0.5}Co_{0.2}Mn_{0.3}$, Easpring) was used as the positive active material.

Comparative Example 3

A mixture was prepared by mixing lithium carbonate ($Li_2CO_3$) and Compound 1A $Ni_{0.55}Co_{0.25}Mn_{0.20}(OH)_2$ to provide Li:(Ni+Co+Mn) at a mole ratio of 1.03:1.

The prepared mixture was subjected to a heat treatment under conditions of heating at 2.5° C./min from 25° C. to 850° C., maintaining at 850° C. for 20 hours, and then cooling down at 2.5° C./min until 25° C. to provide a first compound ($Li_{1.03}Ni_{0.55}Co_{0.25}Mn_{0.20}O_2$). The heat-treating process was performed in an insertion height of 5 cm under an air atmosphere.

Lithium carbonate ($Li_2CO_3$) and Compound 2A ($Ni_{0.55}Co_{0.25}Mn_{0.20}(OH)_2$) having a combination of long needle shapes and sheet shapes were mixed to provide a Li:(Ni+Co+Mn) mole ratio of 1.00 to 1.01:1, and the mixture was subjected to a heat treatment under conditions of heating at 2.5° C./min from 25° C. to 750° C., maintaining at 750° C. for 15 hours, and then cooling down at 5° C./min until 25° C. to provide a second compound represented by $Li_{1.00}Ni_{0.55}Co_{0.25}Mn_{0.20}O_2$. The process was performed under an air atmosphere.

The first compound and the second compound were mixed at a weight ratio of 8:2, and the mixture was subjected to a third heat-treating under a condition of 400° C. to provide a positive active material including the first compound and the second compound.

Herein, the first compound has an average particle diameter (D50) of 20 μm and the second compound has an average particle diameter (D50) of 3 μm.

Comparative Example 4

The commercial product NCM622 ($LiNi_{0.6}Co_{0.2}Mn_{0.2}$, Yumi Koa Co., Ltd.) was used as the positive active material.

Comparative Example 5

The commercial product NCM701515 (LiNi$_{0.7}$Co$_{0.15}$Mn$_{0.15}$, L&F Co., Ltd.) was used as the positive active material.

Comparative Example 6

The commercial product NCM811 (LiNi$_{0.8}$Co$_{0.1}$Mn$_{0.1}$, Yumi Koa Co., Ltd.) was used as the positive active material.

Manufacture of Test Cells

Example 2

94 wt % of the positive active material prepared in Example 1, 3 wt % of ketjen black, and 3 wt % of polyvinylidene fluoride were mixed in N-methyl pyrrolidone solvent to prepare positive active material slurry. The positive active material slurry was coated on an Al foil, followed by drying and compressing the same to manufacture a positive electrode. A 2032-type (format) half-cell was manufactured by a conventional method using the positive electrode, a lithium metal counter electrode, and an electrolyte. The electrolyte was a mixed solvent (50:50 volume ratio) of ethylene carbonate and dimethyl carbonate in which 1.0 M LiPF$_6$ was dissolved.

Comparative Examples 7 to 12

Additional 2032-type half-cells were manufactured according to substantially the same method as Example 2, except that each positive active material prepared in Comparative Example 1 to Comparative Example 6 was used.

Evaluation Examples

The half-cells according to Example 2 and Comparative Examples 7 to 12 were constant current/constant voltage (CC/CV)-charged at 0.2 C and 4.25 V with a cut-off of 0.05 C and CC-discharged at 0.2 C with a cut-off of 3 V for the first charge/discharge (1C=180 mAh/g), and subsequently, a second charge/discharge were performed in the same method as the first charge/discharge.

The 1$^{st}$ differential capacity (dQ/dV)-voltage charge/discharge plots (corresponding to the first charge/discharge) and the 2$^{nd}$ differential capacity (dQ/dV)-voltage charge/discharge plots (corresponding to the second charge/discharge) were measured.

Figure 2B:
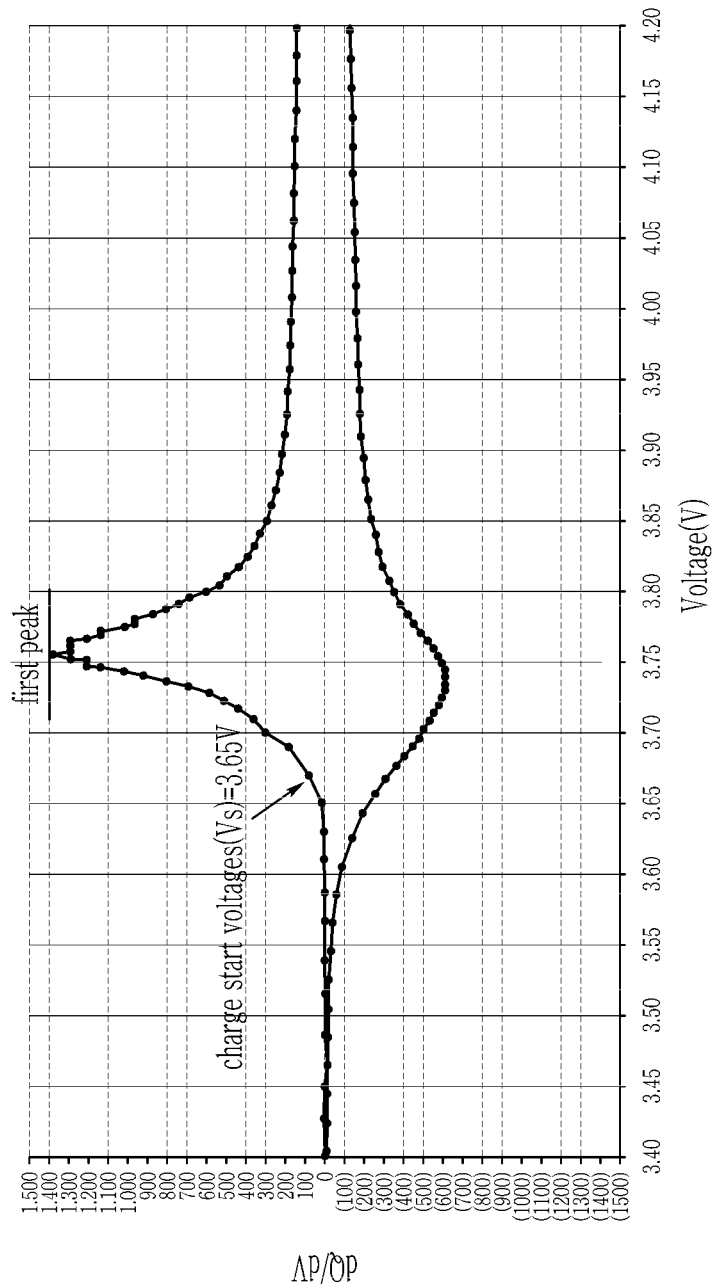
Figure 2C:
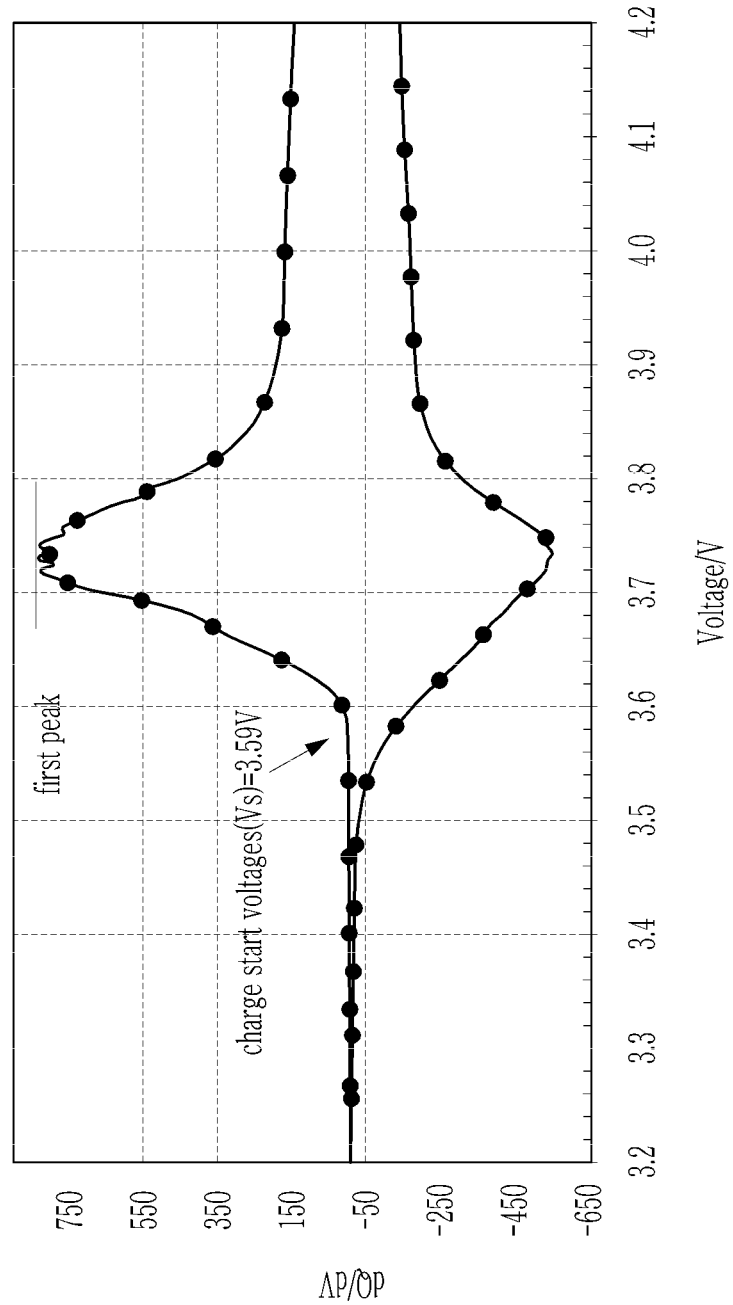
Figure 2D:
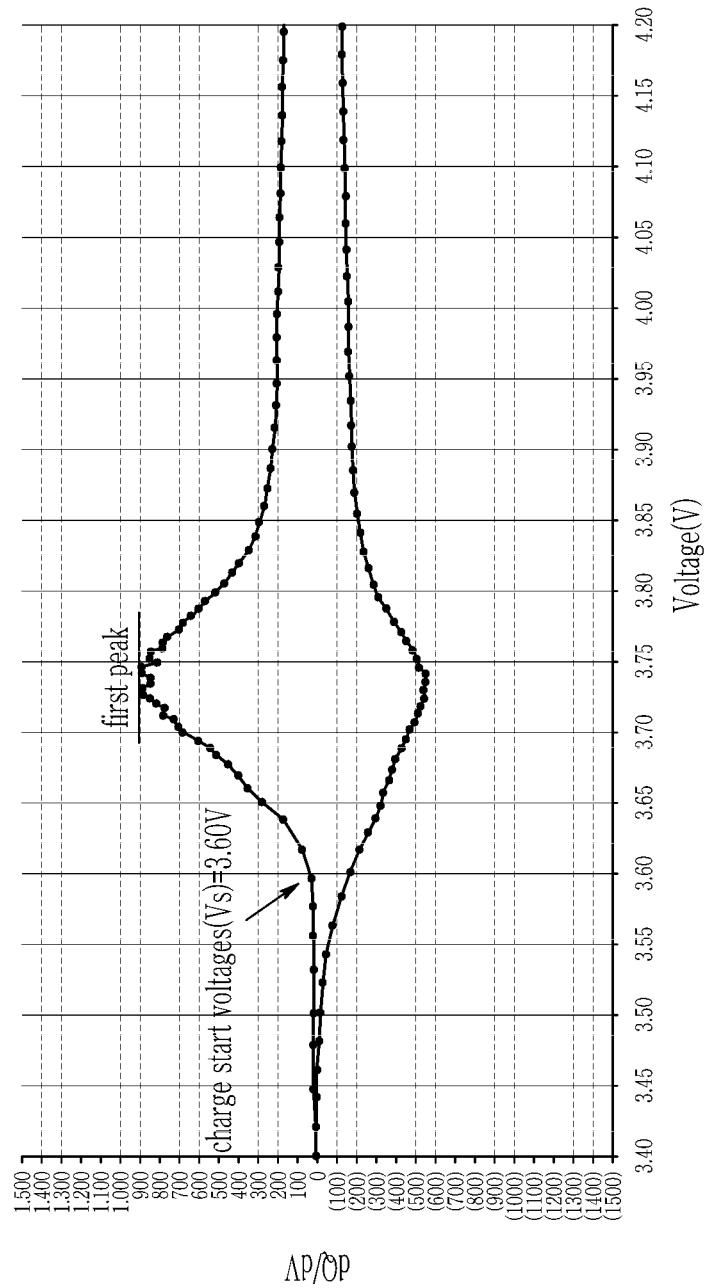
Figure 3B:
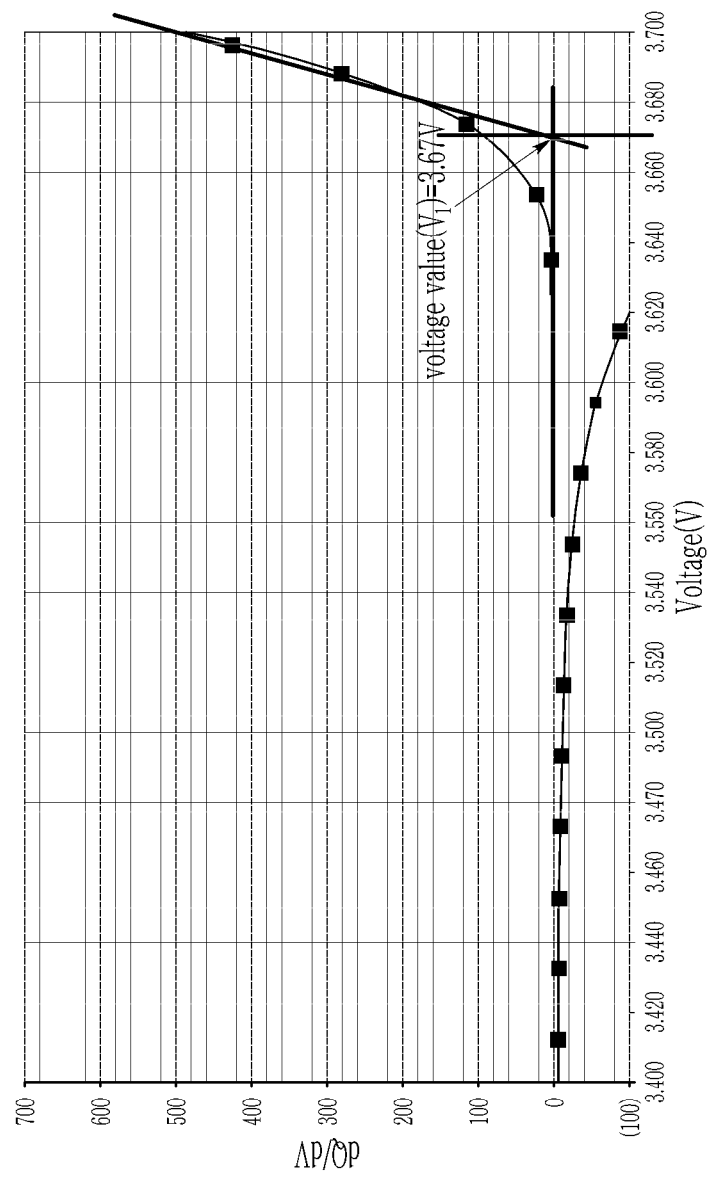
Figure 3C:
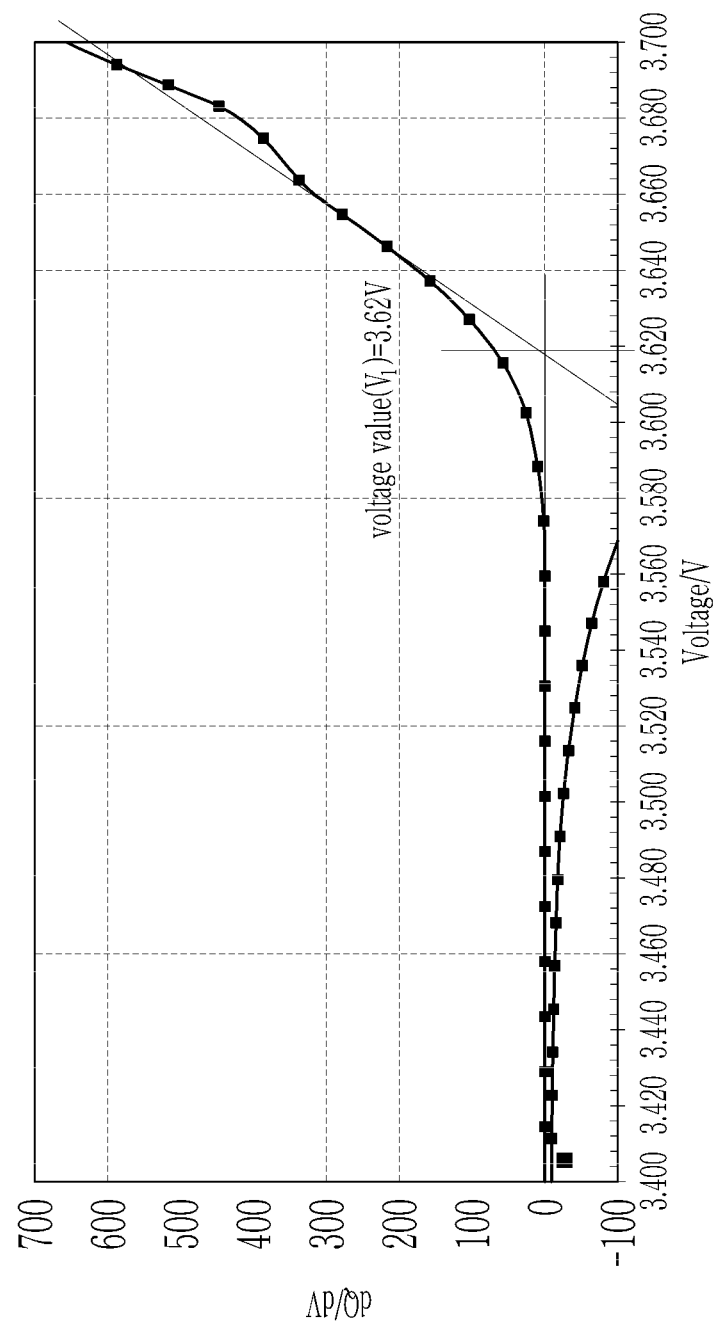
Figure 3D:
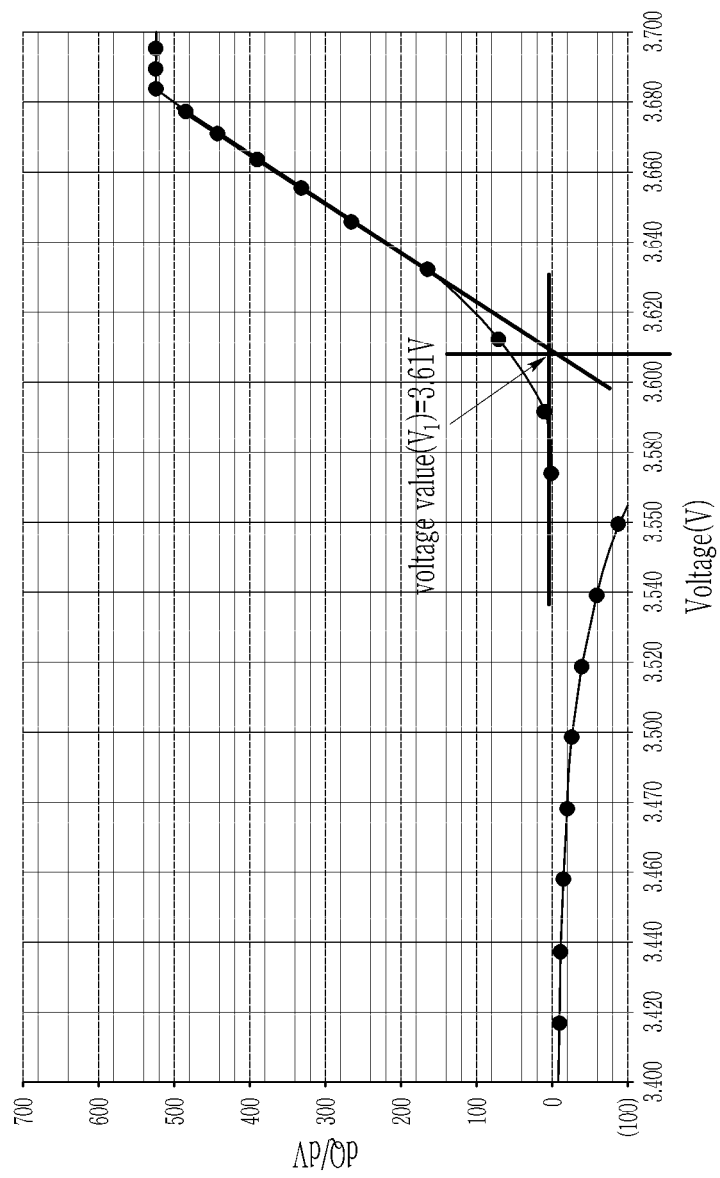

The 1$^{st}$ differential capacity (dQ/dV)-voltage charge/discharge plots of Example 2 and Comparative Examples 8 to 10 are respectively shown in FIGS. 2A and 3A (Example 2), FIGS. 2B and 3B (Comparative Example 8), FIGS. 2C and 3C (Comparative Example 9), and FIGS. 2D and 3D (Comparative Example 10).

The 1$^{st}$ differential capacity (dQ/dV)-voltage charge/discharge plots according to Comparative Examples 7, 8, and 10 to 12 are overlaid in FIG. 3E.

Figure 4B:
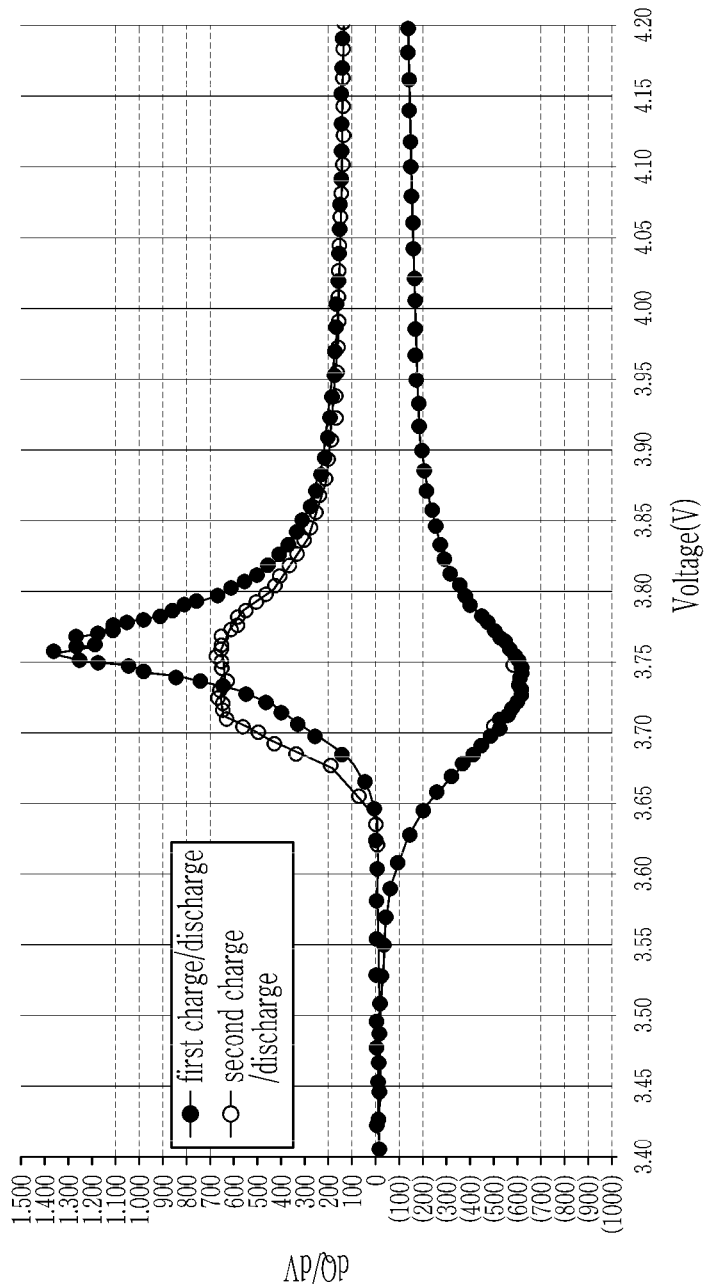
Figure 4C:
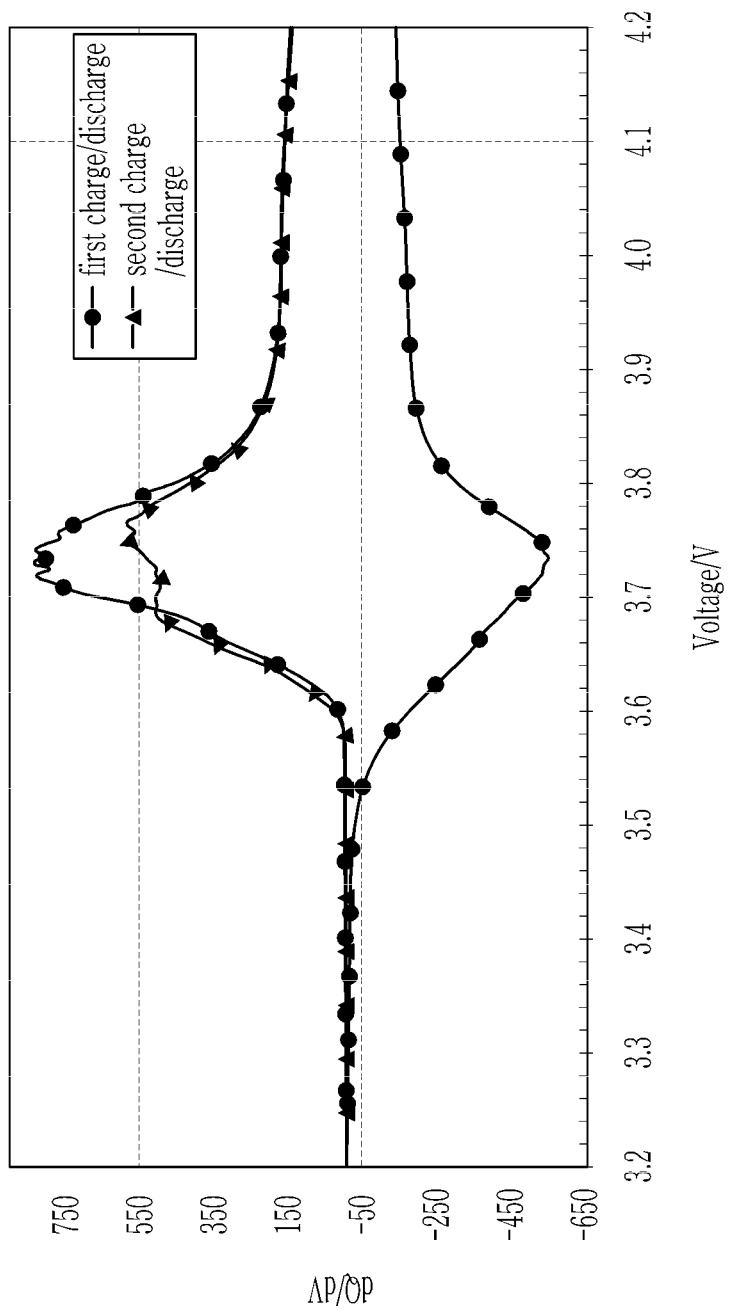
Figure 4D:
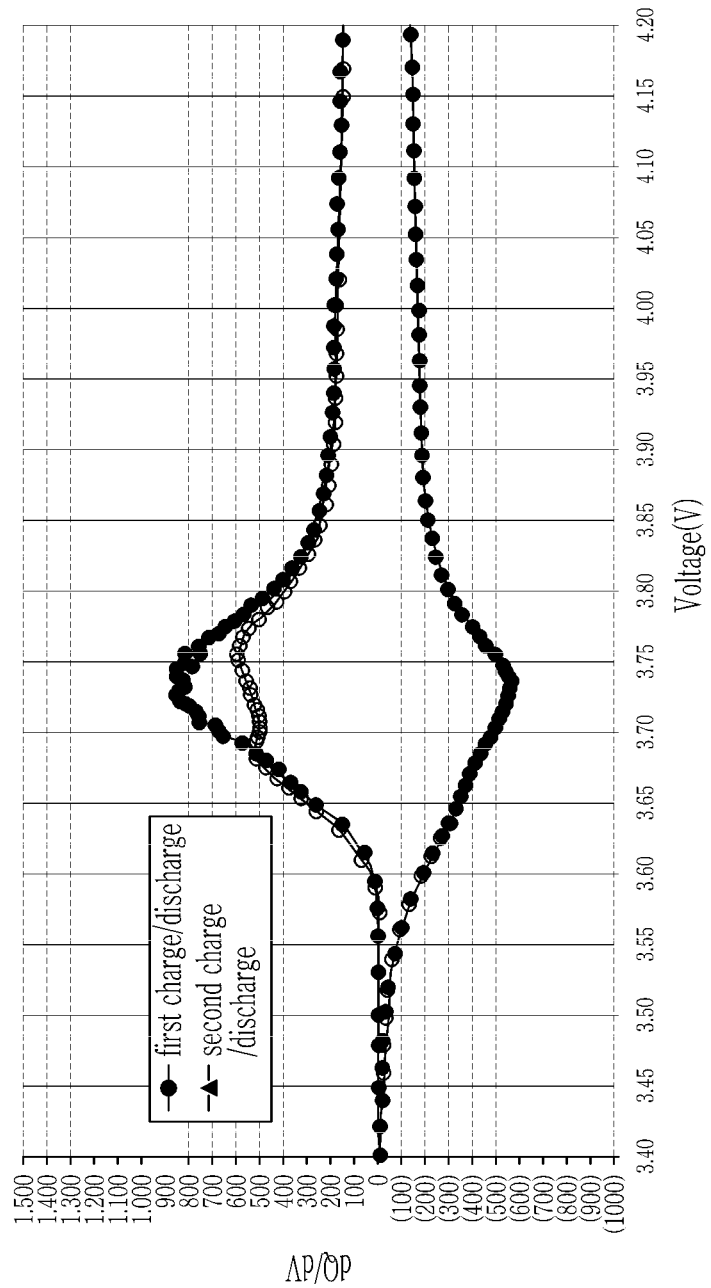

FIG. 4A shows the 1$^{st}$ differential capacity (dQ/dV)-voltage charge/discharge plot of Example 2 compared with the 2$^{nd}$ differential capacity (dQ/dV)-voltage charge/discharge plot of Example 2, and FIGS. 4B, 4C, and 4D respectively show corresponding plots of Comparative Examples 8 to 10.

The charge capacity, discharge capacity, and charge/discharge efficiency according to the first charge/discharge and the second charge/discharge of each sample are shown in Table 1.

TABLE 1

|  |  | Charge capacity (mAh/g) | Discharge capacity (mAh/g) | Charge/discharge efficiency (%) |
|---|---|---|---|---|
| Example 2 (NCM552520) | 1$^{st}$ charge/discharge | 186.4 | 172.4 | 92.5 |
|  | 2$^{nd}$ charge/discharge | 172.3 | 172.0 | 99.8 |
|  | Difference (1$^{st}$ − 2$^{nd}$) | 14.1 | 0.4 | — |
| Comparative Example 8 (NCM523) | 1$^{st}$ charge/discharge | 180.1 | 159.4 | 88.5 |
|  | 2$^{nd}$ charge/discharge | 159.3 | 158.8 | 99.7 |
|  | Difference (1$^{st}$ − 2$^{nd}$) | 20.8 | 0.6 | — |
| Comparative Example 9 (NCM552520) | 1$^{st}$ charge/discharge | 185.3 | 163.7 | 88.3 |
|  | 2$^{nd}$ charge/discharge | 163.5 | 162.8 | 99.6 |
|  | Difference (1$^{st}$ − 2$^{nd}$) | 21.8 | 0.9 | — |
| Comparative Example 10 (NCM622) | 1$^{st}$ charge/discharge | 186.1 | 167.9 | 90.2 |
|  | 2$^{nd}$ charge/discharge | 167.7 | 167.2 | 99.7 |
|  | Difference (1$^{st}$ − 2$^{nd}$) | 18.4 | 0.7 | — |

Evaluation Example 1: Initial Charge and Discharge Capacity and Charge and Discharge Efficiency As shown in Table 1, the half-cell of Example 2 using the positive active material of Example 1 exhibited improved initial charge/discharge capacity and efficiency compared with the half-cells of Comparative Examples 8 to 10 respectively using the positive active materials of Comparative Examples 2 to 4.

In addition, the half-cell of Example 2 exhibited a relatively small decrease (14.1 mAh/g) of the 2$^{nd}$ charge capacity relative to the 1$^{st}$ charge capacity, while the half-cells of Comparative Examples 8 to 10 exhibited a relatively large decrease (18.4 mAh/g to 21.8 mAh/g). Without being bound by the correctness or any explanation or theory, the reason may be that in Comparative Examples 8 to 10, the positive active materials had phase structure changes during the initial charge/discharge.

Evaluation Example 2: 1$^{st}$ Differential Capacity (dQ/dV)-Voltage Charge/Discharge Plot The 1$^{st}$ differential capacity (dQ/dV)-voltage charge/discharge plots of the half-cells according to Example 2 and Comparative Examples 7 to 12 were analyzed, and charge start voltages (V$_s$) and voltages (V$_1$) thereof are shown in Table 2.

TABLE 2

|  | Charge start voltage (V$_s$) (Volt) | Voltage (V$_1$) (Volt) |
|---|---|---|
| Comparative Example 7 (NCM111) | 3.63 | 3.65 |
| Comparative Example 8 (NCM523) | 3.62 | 3.66 |
| Example 2 (NCM552520) | 3.52 | 3.56 |
| Comparative Example 9 (NCM552520) | 3.59 | 3.62 |
| Comparative Example 10 (NCM622) | 3.59 | 3.63 |
| Comparative Example 11 (NCM701515) | 3.58 | 3.62 |
| Comparative Example 12 (NCM811) | 3.60 | 3.65 |

The positive active materials showed a substantially consistent tendency in terms of charge/discharge characteristics depending on a nickel content, and referring to Table 2 and FIGS. 2A to 2D, 3A to 3D, and 3E, as each nickel content of the positive active materials increased, the charge start voltages ($V_s$) and voltages ($V_1$) thereof tended to decrease. Referring to this result and the experiment results of Comparative Examples 8 to 10 of Table 1, as the charge start voltages ($V_s$) and voltages ($V_1$) decreased, the charge/discharge capacity and efficiency thereof were improved.

Although the half-cell of Example 2 included a relatively low 55 at % of nickel, it was out of the aforementioned tendency and exhibited a much decreased charge start voltage ($V_s$) and voltage ($V_1$) compared with Comparative Examples 9 to 12 including nickel at a high content. Accordingly, the charge/discharge capacity and efficiency of Example 2 were much improved.

On the other hand, referring to FIGS. 2A to 2D, the $1^{st}$ differential capacity (dQ/dV)-voltage charge/discharge plot of the half-cell of Example 2 showed two peaks within a range of 3.60 V to 3.85 V, wherein the second peak value (differential capacity) was larger than the first peak value (differential capacity). On the other hand, the $1^{st}$ differential capacity (dQ/dV)-voltage charge/discharge plots of the half-cells of Comparative Examples 7 to 12 each showed a single peak within a range of 3.60 V to 3.85 V.

Evaluation Example 3: $1^{st}$ and $2^{nd}$ Differential Capacity (dQ/dV)-Voltage Charge/Discharge Plot Referring to FIGS. 4A to 4D, the $1^{st}$ differential capacity (dQ/dV)-voltage charge/discharge plot and the $2^{nd}$ differential capacity (dQ/dV)-voltage charge/discharge plot of the half-cell according to Example 2 were almost the same (refer to FIG. 4A), reflecting that the positive active material had no or limited phase structure change during the initial charge/discharge. However, the half-cells according to Comparative Examples 8 to 10 exhibited $2^{nd}$ differential capacity (dQ/dV)-voltage charge/discharge plots that were changed from the $1^{st}$ differential capacity (dQ/dV)-voltage charge/discharge plots (refer to FIGS. 4B, 4C, and 4D), reflecting that the positive active materials exhibited a phase structure change during the initial charge/discharge.

Accordingly, the positive active material of the half-cell according to Example 2 was shown to have improved phase stability compared with the positive active materials of the half-cells according to Comparative Examples 8 to 10, and accordingly, the charge/discharge capacity and efficiency thereof were improved.

Evaluation Example 4: High Temperature Cycle-Life Characteristics

The half-cells of Example 2 and Comparative Examples 7 to 12 were charged at a constant current-constant voltage and 1.0 C (1 C=180 mA/g) under a cut-off condition of 4.25 V and 0.05 C at a high temperature of 45° C., and discharged at a constant current and 1.0 C under a cut-off condition of 3.0 V, and this charge/discharge program was repeated 70 times to measure the discharge capacity. A ratio of discharge capacity at each cycle relative to the $1^{st}$ discharge capacity was obtained. The results for Example 2 and Comparative Examples 8 to 10 are shown in FIG. 5.

Figure 5:
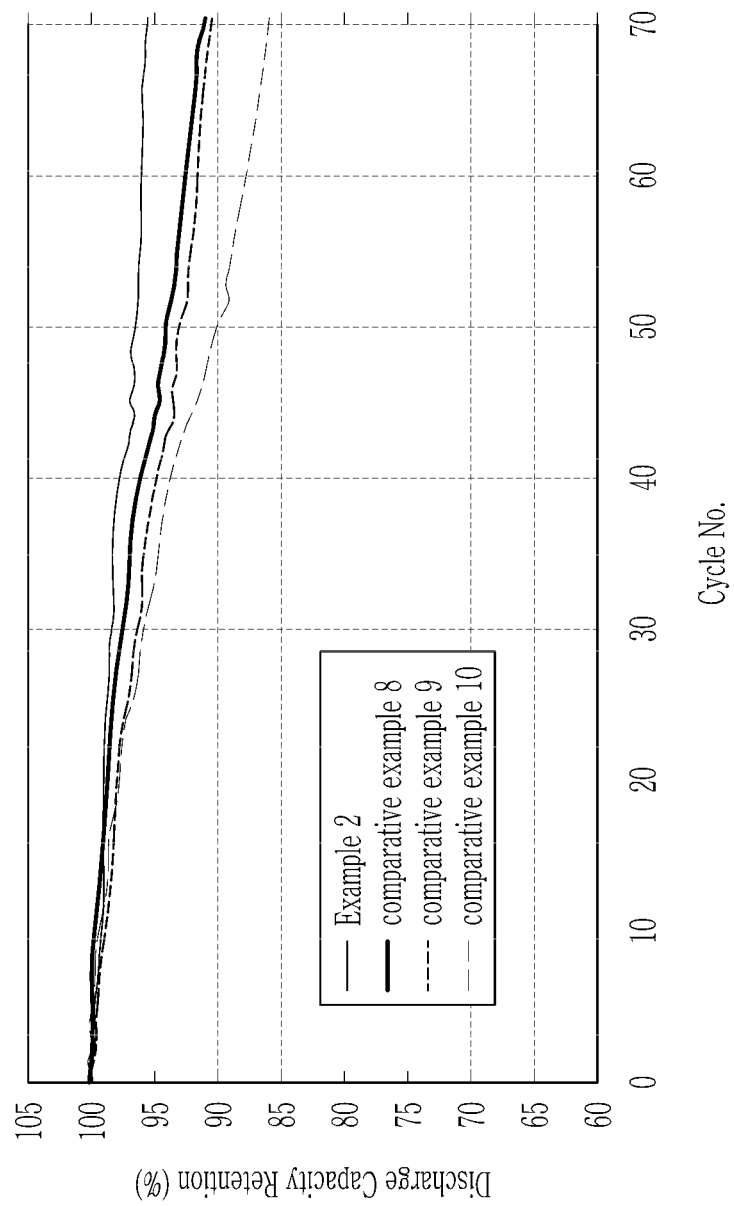
FIG. 5 is a plot comparing the high temperature cycle-life characteristics of the half-cells manufactured in Example 2 and Comparative Examples 8 to 10.

Referring to FIG. 5, the half-cell of Example 2 exhibited excellent high temperature cycle-life characteristics compared with the half-cells according to Comparative Examples 8 to 10.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

10: positive electrode
20: negative electrode
30: separator
40: electrode assembly
50: battery case
100: rechargeable lithium battery

What is claimed is:

1. A positive active material for a rechargeable lithium battery, the positive active material comprising:
    particles of a first compound represented by Chemical Formula 1, and
    particles of a second compound having a smaller average particle diameter than the particles of the first compound and represented by Chemical Formula 2,
    wherein the first compound and the second compound each have a Ni content of about 50 at % to about 60 at % based on the total amount of metal elements excluding Li, and
    a rechargeable lithium battery comprising the positive active material satisfies Relation 1, as determined from a differential capacity (dQ/dV)-voltage charge/discharge plot:

$$Li_aNi_xCo_yM^1_zO_2 \quad \text{[Chemical Formula 1]}$$

$$Li_aNi_xCo_yM^2_zO_2 \quad \text{[Chemical Formula 2]}$$

wherein, in Chemical Formula 1 and Chemical Formula 2, 0.9≤a≤1.05, 0.5≤x≤0.6, 0.05≤y≤0.35, 0.05≤z≤0.35, x+y+z=1, and $M^1$ and $M^2$ are each independently at least one metal element selected from Mn, Al, Cr, Fe, V, Mg, Ti, Zr, Nb, Mo, W, Cu, Zn, Ga, In, Sn, La, and Ce, $$V_s<V_1≤3.6 \quad \text{[Relation 1]}$$

wherein, in Relation 1, $V_1$ is a voltage value at a point where a tangent line to a value corresponding to 50% of the first peak value of the differential capacity (dQ/dV)-voltage charge/discharge plot intersects the line dQ/dV=0, and $V_s$ is a charge start voltage.

2. The positive active material of claim 1, wherein the charge start voltage ($V_s$) of the rechargeable lithium battery is less than or equal to about 3.55 V.

3. The positive active material of claim 1, wherein the voltage ($V_1$) is less than or equal to about 3.58 V.

4. The positive active material of claim 1, wherein the voltage ($V_1$) is about 3.50 V to about 3.58 V.

5. The positive active material of claim 1, wherein a differential capacity (dQ/dV)-voltage charge/discharge plot has at least two peak values in the range of about 3.60 V to about 3.85 V, and the second peak value is larger than the first peak value.

6. The positive active material of claim 5, wherein the first peak value is about 450 $mAhg^{-1}V^{-1}$ to about 550 $mAhg^{-1}V^{-1}$, and the second peak value is about 550 $mAhg^{-1}V^{-1}$ to about 650 $mAhg^{-1}V^{-1}$.

7. The positive active material of claim 1, wherein at least one particle selected from the group consisting of the particles of the first compound and the particles of the second compound comprises a core and a surface layer surrounding the core, a Ni atom concentration (at %) based on the total amount of metal elements excluding Li is higher in the surface layer than in the core, and a cation mixing of the positive active material is less than or equal to about 3%, wherein the cation mixing refers to a percentage of nickel ions ($Ni^{2+}$) mixed to a lithium ion (Li+) site in a lithium layer.

8. The positive active material of claim 7, wherein the surface layer is a region corresponding to a depth of about 200 nm from the surface of the particle.

9. The positive active material of claim 1, wherein the particles of the first compound has an average particle diameter (D50) of about 15 μm to about 20 μm.

10. The positive active material of claim 1, wherein the particles of the second compound has an average particle diameter (D50) of about 2 μm to about 5 μm.

11. The positive active material of claim 1, wherein each of the particles of the second compound has a needle-shape, a sheet-shape, or a combination thereof.

12. The positive active material of claim 1, wherein the particles of the first compound and the particles of the second compound are mixed in a weight ratio of about 90:10 to about 50:50.

13. A method of preparing a positive active material, the method comprising:

mixing particles of Compound 1A represented by Chemical Formula 1A, particles of Compound 2A represented by Chemical Formula 2A having a smaller average particle diameter than the particles of Compound 1A, and a lithium salt to prepare a mixture;

first heat-treating the mixture under a temperature-increasing condition to prepare a first fired product comprising residual lithium; and second heat-treating the first fired product to prepare the positive active material:

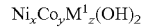  [Chemical Formula 1A]

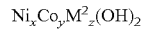  [Chemical Formula 2A]

wherein, in Chemical Formula 1A and Chemical Formula 2A, $0.5 \leq x \leq 0.6$, $0.05 \leq y \leq 0.35$, $0.05 \leq z \leq 0.35$, $x+y+z=1$, and $M^1$ and $M^2$ are each independently selected from Mn, Al, Cr, Fe, V, Mg, Ti, Zr, Nb, Mo, W, Cu, Zn, Ga, In, Sn, La, and Ce.

14. The method of claim 13, wherein the particles of Compound 1A and the particles of Compound 2A are mixed in a weight ratio of about 90:10 to about 50:50.

15. The method of claim 13, wherein in the mixture, a mole ratio of Li/(Ni+Co+Mn) is greater than or equal to about 0.99.

16. The method of claim 13, wherein the first heat-treating comprises a process of maintaining the mixture at about 800° C. to about 1000° C. for about 1 hour to about 4 hours.

17. The method of claim 13, wherein the particles of Compound 2A has a needle-shape, a sheet-shape, or a combination thereof.

18. A rechargeable lithium battery, comprising:
a positive electrode comprising the positive active material of claim 1;
a negative electrode comprising a negative active material; and
an electrolyte.

19. The method of claim 13, wherein the first heat-treating the mixture under the temperature-increasing condition comprises a process of raising a temperature of the mixture from an initial temperature to a first-treating reaction temperature at a rate of about 4° C/min in to about 6° C/min.

20. The method of claim 19, wherein the initial temperature is about 25° C. to about 100° C., and the first heat-treating reaction temperature is about 800° C. to about 1000° C.

* * * * *